(12) United States Patent
Hedding

(10) Patent No.: US 6,441,992 B1
(45) Date of Patent: Aug. 27, 2002

(54) C-RING TAPE PATH AND WRAPPER MECHANISM FOR AUTOMATED TAPE LOADING

(75) Inventor: Larry Robert Hedding, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/512,689

(22) Filed: Feb. 24, 2000

(51) Int. Cl.[7] .............................................. G11B 15/00
(52) U.S. Cl. ........................................................ 360/95
(58) Field of Search ............................ 360/95, 93, 90; 242/324.2, 326, 335; 226/188

(56) References Cited

U.S. PATENT DOCUMENTS

| 3,499,998 A | | 3/1970 | Tanigawa et al. ...... 360/130.21 |
| 4,828,201 A | * | 5/1989 | Smith .......................... 242/195 |
| 5,333,810 A | | 8/1994 | Hoge et al. .............. 242/332.4 |
| 5,628,468 A | | 5/1997 | Jung et al. ................ 242/345.1 |
| 6,082,652 A | * | 7/2000 | Theobald .................. 242/332.4 |

FOREIGN PATENT DOCUMENTS

| EP | 0 074 476 | 3/1983 |
| EP | 0 229 996 | 7/1987 |
| EP | 0 323 167 | 7/1989 |
| EP | 0 375 358 | 6/1990 |
| GB | 854069 | 11/1960 |

OTHER PUBLICATIONS

HTTP://WWW.QUANTUM.COM A Superior Tape Path: The Industry–Leading Reliability . . . , pp. 1–4, Quantum Corporation, Milpitas, California.

* cited by examiner

Primary Examiner—David Hudspeth
Assistant Examiner—Angel Castro
(74) Attorney, Agent, or Firm—Brooks & Kushman P.C.

(57) ABSTRACT

A tape guide mechanism for guiding a tape media adjacent to a transducer, and methods of operation are disclosed. The tape guide mechanism is a C-shaped guide member rotatably mounted around a first reel. The tape media is normally stored spooled around a second reel within a data cartridge. A tape guide surface is formed circumferentially on the guide member. An opening is provided in the tape guide surface to allow the tape media to reach the first reel. In operation, the tape media can be wrapped and unwrapped from the tape guide surface with any amount of tape media spooled around the first reel. This wrapping and unwrapping ability allows the tape to be loaded onto the first reel at the start of the tape media, or at any arbitrary location on the tape media. It also allows the tape media to be rewound to the second reel directly from the first reel, or with the tape media passing across the tape guide surface. Finally, the tape media can be unwound from the tape guide surface, rapidly moved to a predetermined location on the tape media, and then rewound onto the tape guide surface.

30 Claims, 6 Drawing Sheets

C-RING TAPE PATH AND WRAPPER MECHANISM FOR AUTOMATED TAPE LOADING

TECHNICAL FIELD

The present invention is related to the field of tape guide mechanisms for guiding a tape media across a transducer.

BACKGROUND ART

Automatic loading tape drives employ various mechanisms to manipulate magnetic tape media onto a suitable guide path to ensure stable tape media motion past a magnetic read-write head. Existing guide mechanism designs are typically complex and often occupy excessive amounts of volume within a given tape drive. Complex tape guide mechanisms have several disadvantages. Generally, there is a low reliability in such guide mechanisms due to the large number of moving mechanical parts. Some complex designs capture the tape media in such a way that recovering the tape media after a loss of power, mechanical failure, or other malfunction is exceptionally difficult. Other complex guide mechanism designs result in acute wrap angles and multiple points of contact with the tape media and can adversely affect tape media and head wear. In particular, guide mechanisms that repeatedly contact the magnetic side of the tape media can damage the magnetic media over time resulting in loss of data.

What is desired is a simple mechanism that provides a stable tape path, occupies minimal volume, and is easily adapted into existing or new tape drive designs. It is known in the art that the guide path should direct the tape media along a gentle arc to provide transverse stability at the read-write head. Guide mechanisms contacts with the tape media are preferably from the substrate side to minimize the possibility of damage to the magnetic material and subsequent data loss. Finally, the guide mechanism should hold the tape media so that the tape media can be extracted without damage from the tape drive in the event of a mechanical failure or power loss.

DISCLOSURE OF INVENTION

The present invention is a guide mechanism and methods of operating the guide mechanism to position and guide a tape media across the face of a transducer and onto a first reel. The mechanism comprises a guide member that is rotatably mounted about the first reel. A tape guide surface is provided along the outer edge of the guide member. The tape guide surface defines a longitudinal path for the tape media across the transducer. The tape guide surface is also shaped to provide transverse support and guidance for the tape media. An opening is provided in the tape guide surface to allow the tape media to transition between the tape guide surface and the first reel. An optional recession is formed in the tape guide surface that allows the transducer to intrude into the longitudinal path of the tape media and thereby engage the tape media without compressing the tape media between the transducer and the tape guide surface.

In operation in a tape drive configured for single reel data cartridges, the tape media is first threaded from the data cartridge through the opening in the tape guide surface and attached to the first reel. The guide member is then rotated in a wrapping direction causing the tape media to wrap onto the tape guide surface and adjacent to the transducer. After the recession in the tape guide surface has been aligned with the transducer, the transducer is moved to engage the tape media. From this point, the tape media can be moved past the transducer at normal speeds along the longitudinal path defined by the tape guide surface.

The tape media can be unwrapped from the tape guide surface with any amount of tape media spooled on the first reel. A process of unwrapping begins with the disengagement of the transducer from the tape media. The guide member is then rotated in an unwrapping direction until the tape media has been unwrapped from the tape guide surface. Whatever tape media remains spooled on the reel is wound back into the cartridge and then the leader shuttle for the tape media is disengaged from the first reel.

The ability to wrap and unwrap the tape media from the tape guide surface with any amount of tape media spooled on the first reel allows for high speed movement of the tape media without any friction associated with the tape guide surface. Rapid movement to a desired location on the tape media is accomplished by first unwrapping the tape media from the tape guide surface. The tape media is then spooled or unspooled from the first reel at high speeds until the desired location on the tape media is proximate the opening in the tape guide surface. The tape media is then wrapped back onto the tape guide surface. Finally, the tape media is moved across the tape guide surface until the desired location on the tape media is aligned with the transducer.

Accordingly, it is an object of the present invention to provide a guide mechanism that wraps a tape media around itself to serve as a longitudinal path that guides the tape media across a transducer and onto a reel.

Another object of the present invention is to provide a method of operation for the guide mechanism to position the tape media adjacent to the transducer by rotating the guide mechanism.

Yet another object of the present invention is to provide a method for rapidly aligning a predetermined location on the tape media with the transducer wherein high speed tape media movement occurs while the tape media is out of contact with the guide mechanism.

These and other objects, features and advantages, will be readily apparent upon consideration of the following detailed description of the invention in conjunction with the accompanying drawings.

BEST MODE FOR CARRYING OUT THE INVENTION

Figure 1:
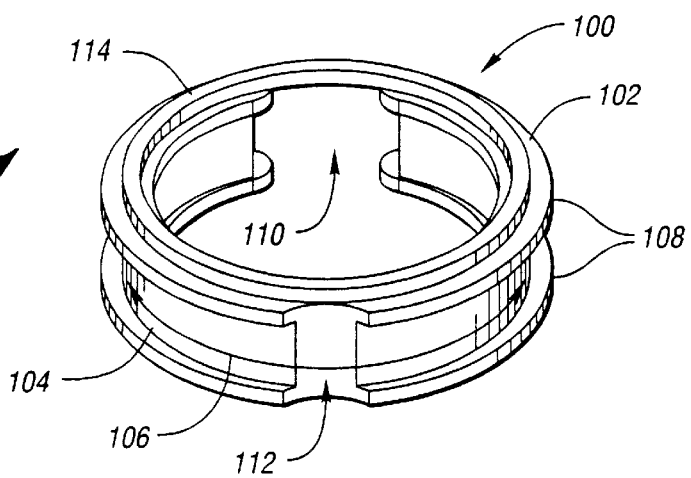
FIG. 1 is a perspective view of a guide mechanism that implements the present invention.

FIG. 1 is a perspective view of a guide mechanism 100 implementing the present invention. The guide mechanism 100 consists of a C-shaped guide member 102, having a tape guide surface 104 provided about its outer edge. The tape guide surface 104 defines a longitudinal path, as indicated by line 106, along which a tape media 200 (shown in FIG. 2) is guided. Curvature of the tape guide surface 104 around the C-ring shape helps provide transverse support for the tape media 200. A pair of flanges 108 provided on opposite sides of the tape guide surface 104 provide transverse guidance for the tape media 200. An opening 110 in the tape guide surface 104 is provided to allow the tape media 200 to traverse through the tape guide surface 104 to reach a machine reel (shown in FIG. 2) coaxially mounted inside the guide member 102. Preferably, a recession 112 is provided in the tape guide surface 104 to accommodate a transducer 202 (shown in FIG. 2) encroaching the longitudinal path 106 of the tape media 200 thus permitting the transducer 202 to engage the tape media 200. Bearing 114 allows the ring guide 102 to rotate in a plane perpendicular to the plane of the tape media 200 while providing lateral stability.

Figure 2:
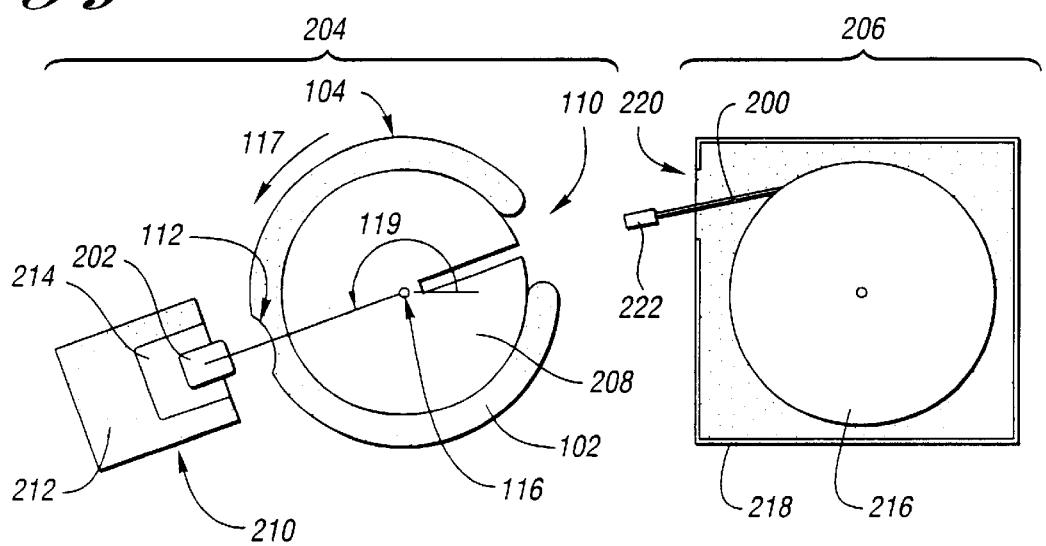
FIG. 2 is a top view of the guide mechanism installed in a tape drive.

FIG. 2 is a top view of the guide mechanism 100 installed in a tape drive 204. The bearing 114 is not shown for clarity. This tape drive 204 is intended to operate with a single reel data cartridge 206. The guide member 102 is mounted coaxially with and circumscribes a machine reel, hereinafter referred to as a first reel 208. Guide member 102 and first reel 208 share a common axis of rotation 116, though they may be rotated independent of each other.

Guide member 102 passes between the first reel 208 and the transducer 202 as it rotates about the first reel 208. The transducer 202 may have a single read or write element, multiple read or write elements, combinations of read and write elements, and the like. In the preferred embodiment, transducer 202 is a combination read-write magnetic tape head commonly used in existing magnetic tape drives. Transducer 202 is mounted on a servo mechanism 210 to provide linear motion along a radial path relative to the common axis of rotation 116. Servo mechanism 210 includes a drive mechanism 212 at a fixed position in the tape drive 204, and a moveable platform 214. Transducer 202 is carried on the platform 214.

Other types of transducers 202 and tape media 200 may be used with the present invention. For example, the transducer 202 may be an optical camera capable of reading an optical tape media storing reduced images of documents. In another example, a laser transducer may be used to read and write digital data from an optically sensitive tape media. In these two examples, it is not necessary for the transducer to make direct physical contact with the optical tape media. Consequently, in these later two examples the recession 112 in the tape guide surface 104 is not necessary. The recession 112 may still be included in the guide mechanism 100 for other purposes. In the case of the optical camera transducer, the recession 112 may provide a path for a light source that provides back side illumination for the optical tape media. Where a laser transducer is employed, the recession 112 may be shaped to scatter the laser beam away from the optical tape media to avoid reflected laser light from impinging the optical tape media in a second location. In still other cases, recession 112 provides access to the substrate side of the tape media 200 allowing for transverse position transducer servo tracking from the back side of the tape media 200.

The single reel data cartridge 206 includes a file reel, hereinafter referred to as a second reel 216, for holding the tape media 200. The second reel 216 is rotatably mounted inside a housing 218. A housing opening 220 allows the tape media 200 to enter and exit the housing 218. A leader shuttle 222 is provided at a free end of the tape media 200. Leader shuttle 222 makes it possible for a threader mechanism (not shown) to pull the tape media 200 out of the single reel data cartridge 206 and thread the tape media 200 through the opening 110 in the tape guide surface 104 and onto the first reel 208.

Figure 3:
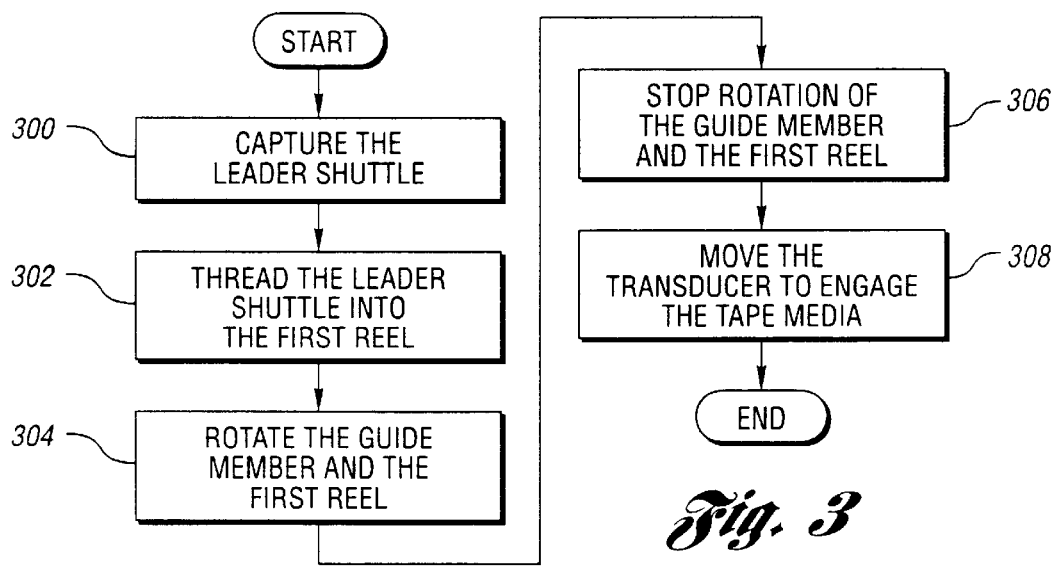
FIG. 3 is a flow diagram of a method for loading a tape media into the tape drive.

FIG. 3 is a flow diagram of a method of loading the tape media 200 onto the tape drive 204 using the configuration shown in FIG. 2. First, the threader mechanism captures the leader shuttle 222, as shown in block 300. The threader mechanism then pulls the leader shuttle 222 through the opening 110 in the tape guide surface 104 and threads it into the first reel 208, as shown in block 302. While the leader shuttle 222 is held at the center of the first reel 208, the guide member 102 and the first reel 208 are rotated in a wrapping direction, as shown by arrow 117 in FIG. 2, to wrap the tape media 200 onto the tape guide surface 104, as shown in block 304. By rotating the first reel 208 along with the guide member 102, the tape media 200 does not begin to spool (wind) around the first reel 208 while the guide member 102 is in motion. In an alternative embodiment of this method, the first reel 208 may be held stationary while the guide member 102 is rotated thus causing the tape media 200 to begin to spool around the first reel 208. Once the guide member 102 has reached an alignment angle 119 (see FIG. 2) the rotation of the guide member 102 and the first reel 208 are stopped, as shown in block 306. The recession 112, if implemented, is aligned with the transducer 202 at the alignment angle 119. Alignment angle 119 is measured by an angle sensor 118, shown in FIG. 7, that is part of the guide mechanism 100.

Figure 4:
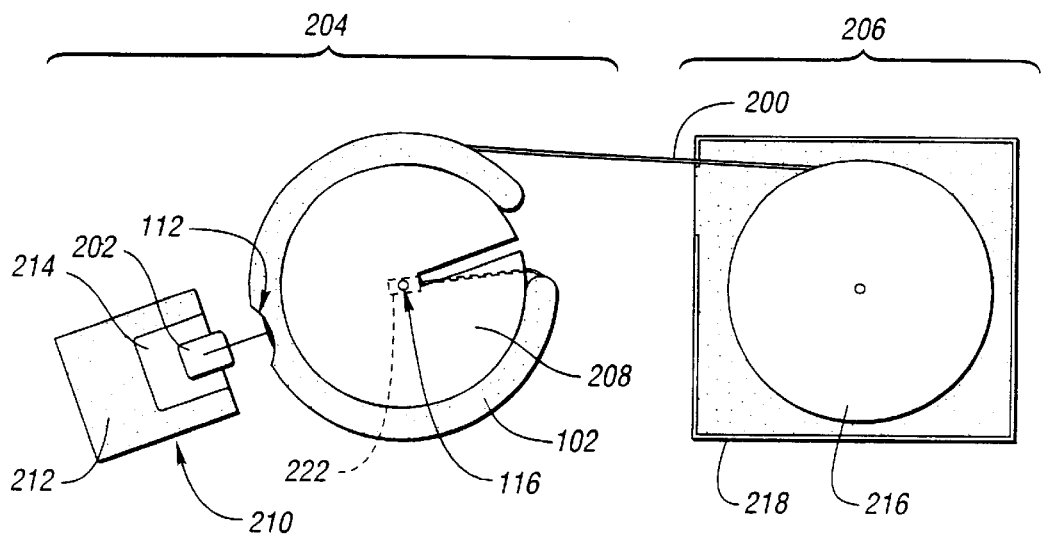
FIG. 4 is a top view of the guide mechanism with the tape media fully wrapped around the guide mechanism.

FIG. 4 shows the position of the leader shuttle 222 (shown in phantom), tape media 200, guide member 102 and first reel 208 when the guide member 102 has reached the alignment angle 119. If necessary, the transducer 202 is then moved into contact with the tape media 200, as shown in block 308. The tape media 200 is now loaded into the tape drive 204 and may be advanced past the transducer 202 by rotating the first reel 208 while the guide member 102 remains stationery.

Figure 5:
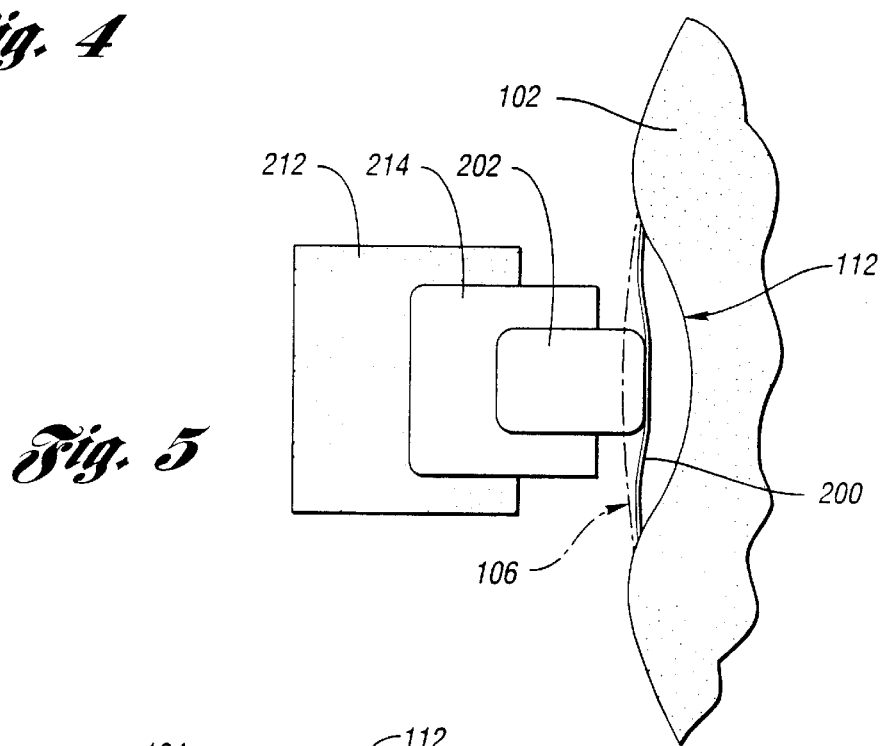
FIG. 5 is a partial top view showing the transducer engaging the tape media.

FIG. 5 is a partial top view showing the transducer 202 engaging the tape media 200 at the recession 112. Note that the transducer 202 intrudes the longitudinal path 106 when engaging the tape media 200. This intrusion provides extremely close transducer 202 to tape media 200 positioning, and a head-lift functionality that normally occurs when a magnetic tape media moves across a magnetic head. The head-lift function is caused by a thin layer of air trapped between the transducer 202 (head) and tape media 200 while the tape media 200 is in motion.

Figure 6:
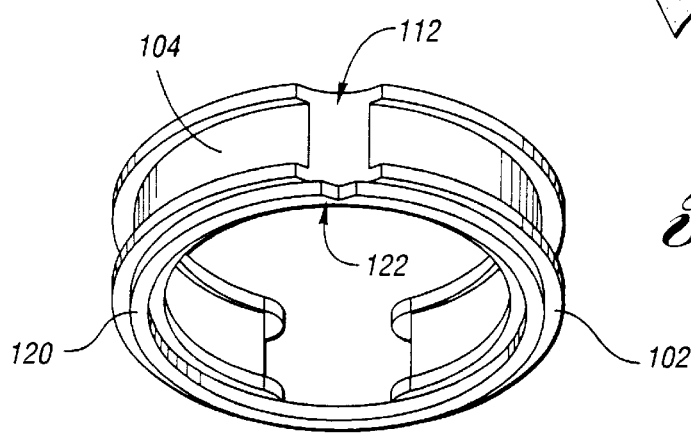
FIG. 6 is a perspective view of a second embodiment of the guide mechanism including a cam.
Figure 7:
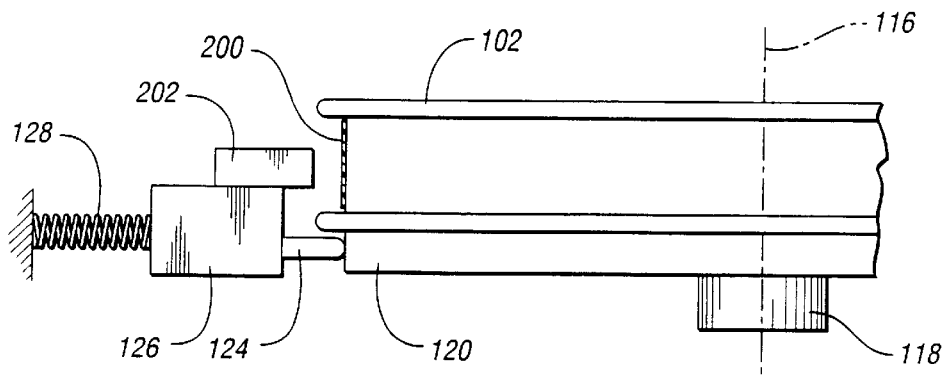
FIG. 7 is a partial cross-sectional side view of the second embodiment of the guide mechanism showing the transducer disengaged from the tape media.
Figure 8:
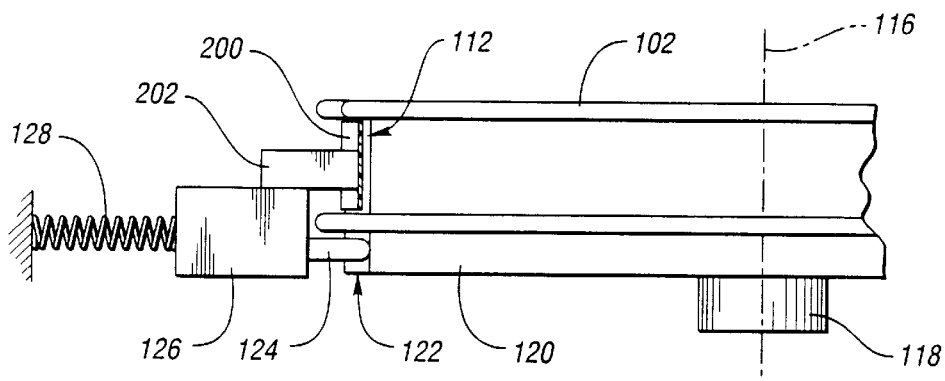
FIG. 8 is a partial cross-sectional side view of the second embodiment of the guide mechanism showing the transducer engaged with the tape media.

FIGS. 6, 7 and 8 illustrate an embodiment in which a profile of the guide member 102 can be used to facilitate movement of the transducer 202 radially in place of the servo mechanism 210. A cam 120 may be provided about the circumference of the guide member 102. The cam 120 includes an indentation 122 at a predetermined position with respect to, or aligned with the recession 112 in the tape guide surface 104. This cam 120 is engaged by a cam follower 124 coupled to the transducer 202 through a moveable platform 126. The shape and depth of the indentation 122 controls the movement of the transducer 202 to engage and disengage the tape media 200 in the vicinity of the recession 112. A member 128, such as a spring, biases the moveable platform 126 and cam follower 124 toward the cam 120.

When the transducer 202 is not aligned with the recession 112, the cam follower 124 is outside the indentation 122, as shown in FIG. 7, and the transducer 202 is disengaged from the tape media 200. As the cam follower 124 enters the indentation 122, the resilient member 128 biases the moveable platform 126 carrying the transducer 202 to move toward the recession 112, as shown in FIG. 8. Further rotation of the guide member 102 in either direction will cause the cam follower 124 to ride up and out of the indentation 122, displacing the moveable platform 126 and transducer 202 away from the tape media 200. One advantage of this embodiment is that it eliminates the need for the drive mechanism 212 shown earlier in FIG. 2.

Figure 9:
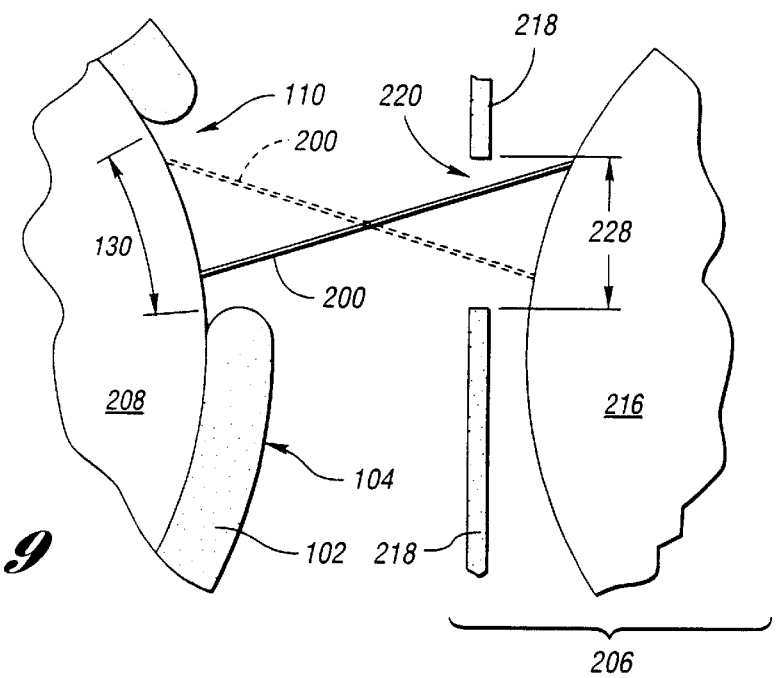
FIG. 9 is a partial top view showing possible tape paths between two reels when the tape is unwrapped from the guide mechanism.
Figure 10:
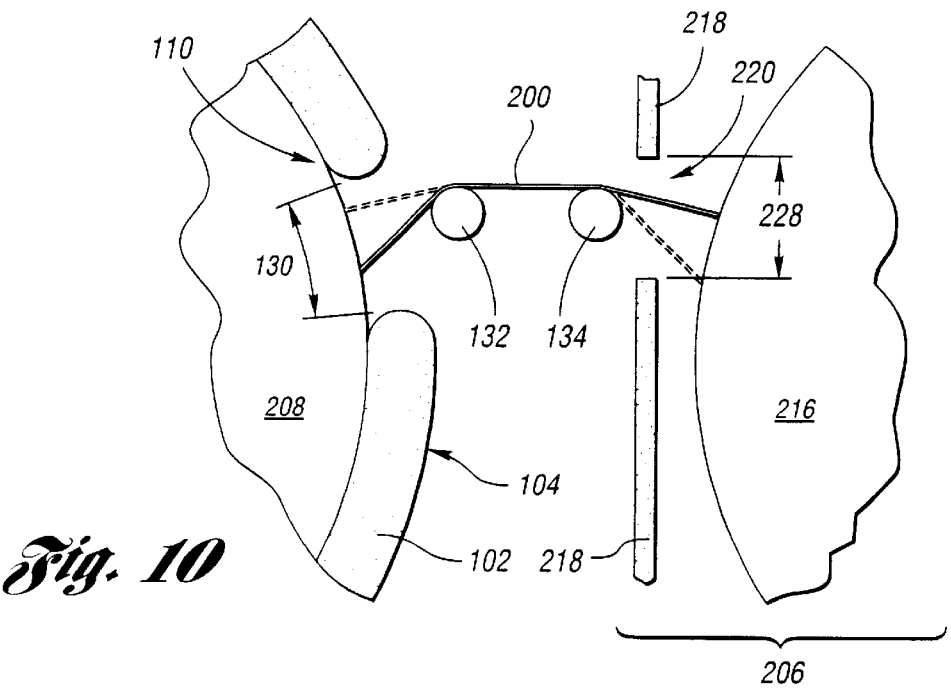
FIG. 10 is a partial top view showing the possible tape paths between the two reels using additional guides.

The guide mechanism 100 may include fixed position guides to help direct the tape media 200 between the first reel 208 and the second reel 216. FIG. 9 shows the two extreme conditions where all of the tape media 200 is spooled around the second reel 216, and when all of the tape media 200 (shown by the dashed line) is spooled around the first reel 208. To avoid contact between the tape media 200 and the guide member 102 under these allocations between the first and second reels 208 and 216, the opening 110 in the tape guide surface 104 must have a minimum width, shown by distance 130. Likewise, the housing opening 220 for the single reel data cartridge 206 must also have a minimum width, shown by distance 228 to avoid interfering with the tape media 200 when the allocation of the tape media 200 is all spooled around the first reel 208 and all spooled around the second reel 216.

Path variations of the tape media 200 through the opening 110 in the tape guide surface 104 are minimized by routing the tape media 200 across a first guide 132 mounted at a first predetermined position proximate the first reel 208. A second guide 134 mounted at a second predetermined position proximate the second reel 216 minimizes the path variations of the tape media 200 through the housing opening 220 in the single reel data cartridge 206. The first and second guides 132–134 may be stationery posts, rollers, or other suitable guiding devices known in the art. One or both of the first and second guides 132–134 may incorporate a tachometer function to measure the length of tape media 200 transferred from the second reel 216 to the first reel 208.

Figure 11:
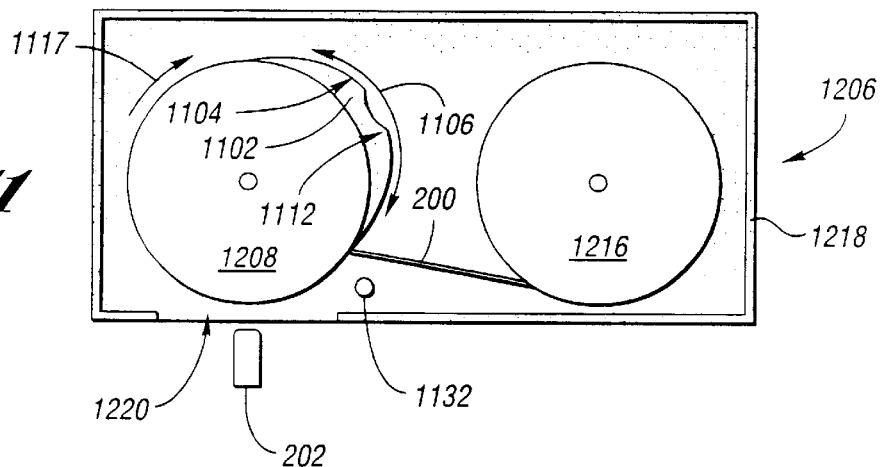
FIG. 11 is a top view of a dual reel tape cartridge embodying the present invention wherein the tape is unwrapped from the guide mechanism.

The present invention may also be applied to a dual reel data cartridge 1206 having both a first reel 1208 and a second reel 1216 inside a housing 1218. FIG. 11 is a top view of a dual reel data cartridge 1206 that incorporates a second embodiment of a guide member 1102, coaxially mounted around the first reel 1208. This guide member 1102 covers only a small distance around the circumference of the first reel 1208, as compared with the preferred embodiment of the guide member 102 that spans most of the circumference of the first reel 208. Another variation shown by the second embodiment of the guide member 1102 is that the longitudinal path 1106 defined by the tape guide surface 1104 is elliptical instead of circular, as in the preferred embodiment.

Figure 12:
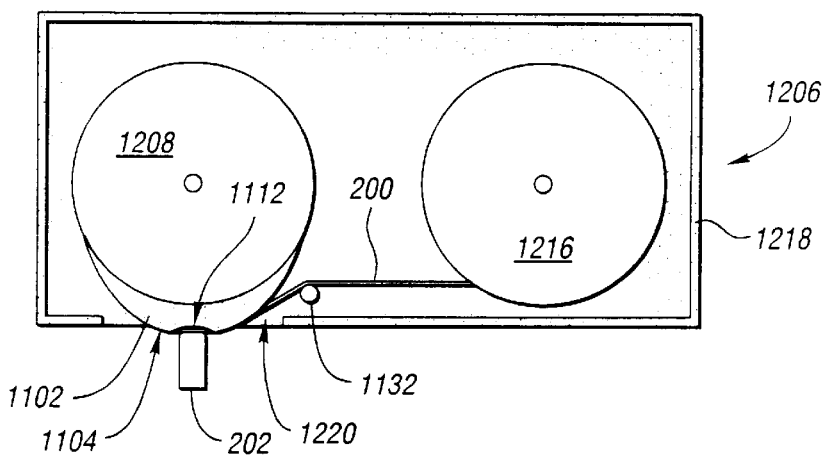
FIG. 12 is a top view of the dual reel tape cartridge with the tape wrapped onto the guide mechanism.

With the tape media 200 unwrapped from the tape guide surface 1104, the tape media 200 resides entirely inside the housing 1218. Rotating the guide member 1102 in the wrapping direction, shown as arrow 1117, causes the tape media 200 to wrap onto the tape guide surface 1104, as shown in FIG. 12. Rotation of the guide member 1102 is stopped when the recession 1112 in the tape guide surface 104 is positioned within a housing opening 1220 in the dual reel data cartridge 1206, and is aligned with the transducer 202. Note that the shape of the tape guide surface 1104 and/or its position within the housing 1218 can be chosen such that the tape guide surface 1104 protrudes or does not protrude through the housing opening 1220 when aligned with the transducer 202. Protrusion of the tape guide surface 1104 through the housing opening 1220 allows the transducer 202 to engage the tape media 200 external to the housing 1218. Consequently, the design of the transducer 202 can be made independent of the housing 1218. In an alternative embodiment (not shown), the tape guide surface 1104 may be designed to remain within the housing 1218 at all positions of the guide member 1102. In this case, the transducer 202 must be designed to traverse through the housing opening 1220 to engage the tape media 200 inside the housing 1218.

Referring back to FIG. 2, the ability to wrap and unwrap the tape media 200 from the tape guide surface 104 allows tape drive 204 to operate in accordance with several different methods. These methods include, but are not limited to spooling the tape media 200 onto the first reel 208 to an arbitrary location before wrapping the tape media 200 onto the tape guide surface 104, unloading the tape media 200 from the first reel 208 with or without passing across the tape guide surface 104, and rapidly repositioning the tape media 200 before the transducer 202 without pulling the tape media 200 across the tape guide surface 104. While these methods are described in terms of the single reel data cartridge 206, they may also be applied in terms of the dual reel data cartridge 1206 with appropriate modifications. FIG. 3 discussed earlier, described a method of loading the tape media 200 onto the first reel 208 at the start of the tape media 200.

Figure 13:
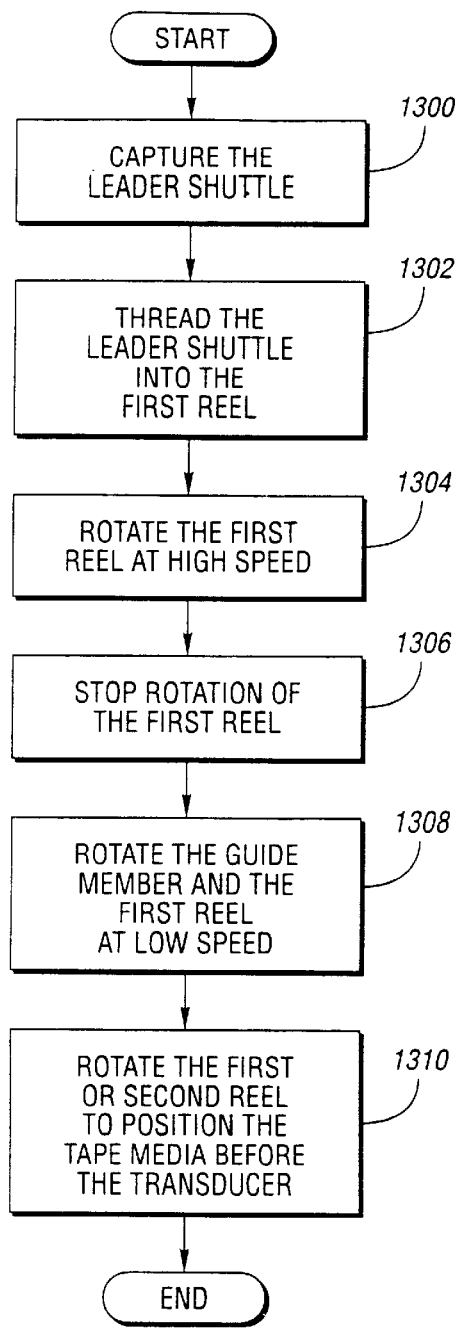
FIG. 13 is a flow diagram of a method for wrapping the tape media onto the guide mechanism at an arbitrary location on the tape media.

FIG. 13 is a flow diagram of a method for wrapping the tape media 200 onto the guide mechanism 100 at an arbitrary location away from the leader shuttle 222. This method starts with capturing the leader shuttle 222, as shown in block 1300. The leader shuttle 222 is then threaded into the first reel 208, as shown in block 1302. Next, the first reel 208 is rotated at high speed to advance the tape media 200 quickly, as shown in block 1304. Spooling of the tape media 200 onto the first reel 208 continues until a desired location on the tape media 200 becomes proximate the first reel 208, as shown in block 1306. Next, the first reel 208 and the guide member 102 are rotated together in the wrapping direction 117 to wrap the tape media 200 onto the tape guide surface 104, as shown in block 1308. Finally, the first reel 208 or the second reel 216 is rotated appropriately to align the desired location on the tape media 200 with the transducer 202, as shown in block 1310. It should be noted that use of this method in the presence of the first guide 132 provides better packing of the tape media 200 onto the first reel 208 than without the first guide 132.

Figure 14:
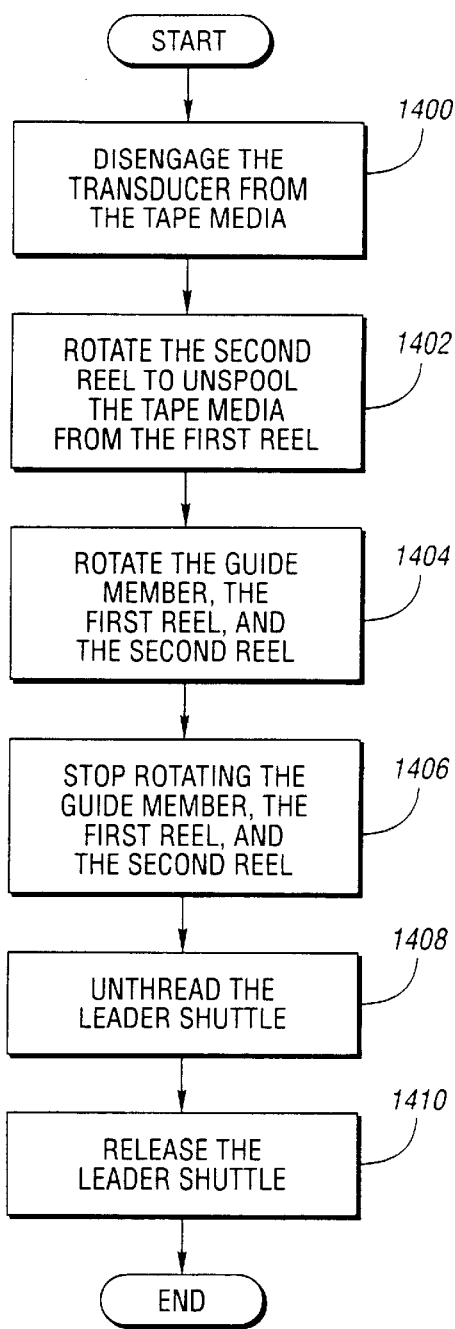
FIG. 14 is a flow diagram of a method for unwrapping the tape media from the guide mechanism.

FIG. 14 is a flow diagram of a method of unloading the tape media 200 from the first reel 208 while the tape media 200 is wrapped around the tape guide surface 104. This method starts by disengaging the transducer 202 from the tape media 200, as shown in block 1400. In tape drives 204 where the transducer 202 is moved by way of the drive mechanism 212, disengagement is provided by activating the drive mechanism 212. In tape drives 204 where transducer 202 is moved by way of the cam 120 and cam follower 124, disengagement is provided by a small rotation of the guide member 102. Next, the second reel 216 is rotated to unspool the tape media 200 from the first reel 208, as shown in block 1402. After all the tape media 200 has been unspooled from the first reel 208, the guide member 102 and first reel 208 are rotated in the unwrapping direction (opposite the wrapping direction 117), and the second reel 216 continues to rotate to unwrap the tape media 200 from the tape guide surface 104, as shown in block 1404. Movement of the guide member 102, first reel 208 and second reel 216 are halted once the tape media 200 is unwrapped from the tape guide surface 104, as show in block 1406. Next, the leader shuttle 222 is unthreaded from the first reel 208, as shown in block 1408. Finally, the threader mechanism releases the leader shuttle 222, as shown in block 1410.

Figures 15, 16:
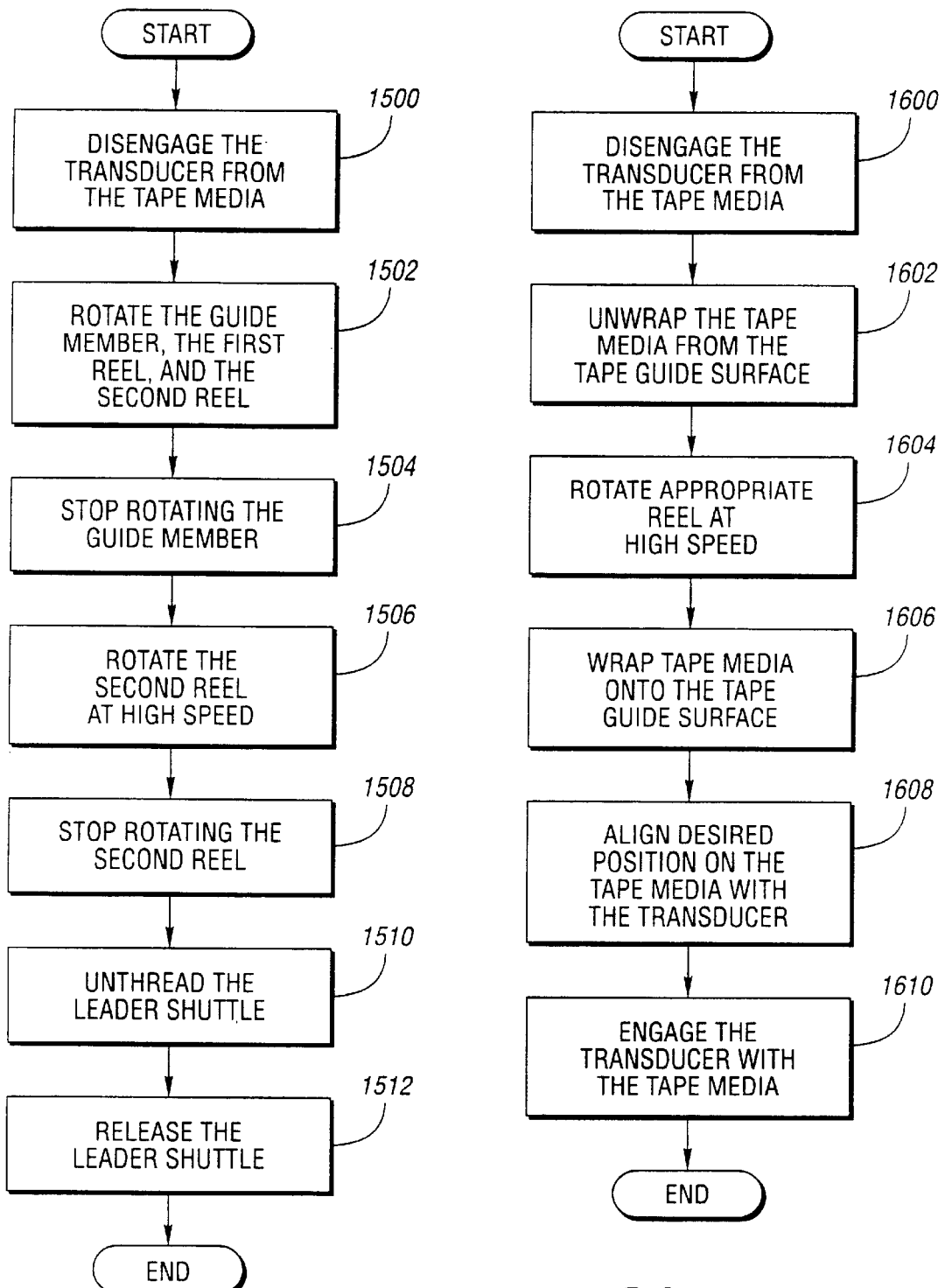
FIG. 15 is a flow diagram of a method for unspooling the tape media from the first reel at high speed.
FIG. 16 is a flow diagram for a method to quickly move a predetermined location on the tape media to the transducer without pulling the tape media across the guide mechanism.

FIG. 15 is a flow diagram for a method of unloading the tape media 200 from the first reel 206 without pulling the tape media 200 across the tape guide surface 104. The function begins with the disengagement of the transducer 202 from the tape media 200, as shown in block 1500. Next, the guide member 102, first reel 208, and second reel 216 are rotated in the unwrapping direction to unwrap the tape media 200 from the tape guide surface 104, as shown in block 1502. Rotation of the guide member 102 is stopped when the tape media 200 in unwrapped from the tape guide surface 104, as shown in block 1504. The second reel 216 is then rotated at high speed to unspool the tape media 200 from the first reel 208, as shown in block 1506. Rotation of the second reel 216 is stopped when all of the tape media 200 is unspooled from the first reel 208, as shown in block 1508. The threader mechanism then unthreads the leader shuttle 222, as shown in block 1510. Finally, the leader shuttle is released, as shown in block 1512. It should be noted that this method provides better packing of the tape media 200 onto the second reel 216 when the second guide 134 is employed to guide the tape media 200 than without using the second guide 134.

FIG. 16 is a flow diagram for a method for rapidly moving a predetermined location on the tape media 200 to the transducer 202 without pulling the tape media 200 across the tape guide surface 104. The method starts by disengaging the transducer 202 from the tape media 200, as shown in block 1600. Next, the guide member 102, first reel 208 and second reel 216 are rotated in the unwrapping direction to unwrap the tape media 200 from the tape guide surface 104, as shown in block 1602. The first reel 208 or the second reel 216 is then rotated accordingly to bring the desired location on the tape media proximate to the first reel 208, as shown in block 1604. The guide member 102 and the first reel 208 are then rotated in the wrapping direction 117 to wrap the tape media 200 onto the tape guide surface 104, as shown in block 1606. In tape drives 204 where the transducer 202 is moved radially by way of the cam 120 and cam follower 124, the transducer 202 engages the tape media 200 as the guide member 102 reaches the alignment angle 119 where the cam follower 124 enters the indentation 122 of the cam 120. In tape drives 204 where the drive mechanism 212 provides radial motion for the transducer 202, the transducer 202 remains disengaged from the tape media 200 at block 1606. The appropriate first reel 206 or second reel 216 is then rotated to align the desired location on the tape media 200 with the transducer 202, as shown in block 1608. Finally, in tape drives 204 incorporating the drive mechanism 212, the transducer 202 is moved to engage the tape media, as shown in block 1610. This allows the transducer 202 to resume exchanging (reading and writing) information with the tape media 200.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A mechanism for positioning a tape media adjacent to a transducer and onto a first reel having an axis of rotation, wherein the tape media extends to a second reel that is spaced away from the first reel, the mechanism comprising:
   a guide member rotatably disposed about the first reel and not the second reel, the guide member being operative to rotate in a wrapping direction and an unwrapping direction; and
   a tape guide surface provided on the guide member to define a longitudinal path for the tape media adjacent the transducer and to provide transverse support for the tape media, the tape guide surface having an opening to allow the tape media to traverse through the tape guide surface to and from the first reel, the tape guide surface further having a recession to permit the transducer to engage the tape media, wherein the tape media is operative to be wrapped onto and unwrapped from the tape guide surface when the guide member is rotated in the wrapping direction and the unwrapping direction respectively.

2. The mechanism of claim 1 further comprising a cam provided on the guide member, the cam having an indentation at a predetermined position with respect to the recession in the tape guide surface to control engagement and disengagement of the transducer with the tape media.

3. The mechanism of claim 2 further comprising a cam follower coupled to the transducer and engaging the cam, the cam follower being operative to permit the transducer to move into the longitudinal path at the recession to engage the tape media when the cam follower is in the indentation.

4. The mechanism of claim 1 further comprising a first guide proximate the first reel to guide the tape media through the opening in the tape guide surface at least while the tape media is unwrapped from the tape guide surface.

5. The mechanism of claim 1 further comprising a second post disposed proximate the second reel to guide the tape media to and from the second reel.

6. The mechanism of claim 1 wherein the opening in the tape guide surface is sufficiently large to avoid contact between the tape media and the tape guide surface for all allocations of the tape media between the first reel and the second reel while the tape media is unwrapped from the tape guide surface.

7. The mechanism of claim 1 further comprising an angle sensor coupled to the guide member to measure an angular position of the guide member with respect to the transducer.

8. The mechanism of claim 1 wherein the guide member has a pair of flanges provided on opposite sides of the tape guide surface to provide transverse guidance of the tape media.

9. The mechanism of claim 1 wherein the longitudinal path is circular.

10. The mechanism of claim 1 wherein the longitudinal path is elliptical.

11. A method of positioning a tape media adjacent to a transducer, the method comprising:

providing a first reel adapted to receive the tape media;

providing a guide member having a tape guide surface, the guide member being rotatably disposed about the first reel and positionable adjacent to the transducer;

rotating the guide member in a wrapping direction to wrap the tape media onto the tape guide surface and to guide the tape media adjacent to the transducer;

stopping rotation of the guide member after the step of rotating the guide member in the wrapping direction; and then rotating the first reel while the guide member remains stationary to wrap the tape media onto the first reel.

12. The method of claim 11 further comprising rotating the first reel while rotating the guide member to maintain spooling of the tape media on the first reel while the guide member is rotating.

13. The method of claim 11 wherein the tape guide surface has a recession, the method further comprising engaging the transducer with the tape media at the recession in the tape guide surface in response to rotating the guide member in the wrapping direction.

14. The method of claim 11 wherein the tape guide surface has an opening through which the tape media traverses to and from the first reel, the method further comprising routing the tape media through a first predetermined location proximate the first reel to guide the tape media through the opening in the tape guide surface while the tape media is unwrapped from the tape guide surface.

15. The method of claim 11 wherein the tape guide surface has a recession, the method further comprising measuring an angular position of the guide member with respect to the transducer, and wherein the step of stopping rotation of the guide member includes stopping rotation of the guide member when the guide member is at an alignment angle where the recession is aligned with the transducer.

16. A method of claim 11 further comprising:

rotating the guide member in an unwrapping direction, opposite the wrapping direction, after completing rotation of the guide member in the wrapping direction to unwrap the tape media from the tape guide surface;

rotating one reel of the first reel and a second reel to move a predetermined location on the tape media proximate the first reel;

rotating the guide member in the wrapping direction to wrap the tape media onto the tape guide surface of the guide member; and rotating one reel of the first reel and the second reel to move the tape media along the tape guide surface to align the predetermined location on the tape media with the transducer.

17. The method of claim 16 further comprising:

disengaging the transducer from the tape media in response to starting rotation of the guide member in the unwrapping direction to eliminate friction between the transducer and the tape media during subsequent tape media movements; and engaging the transducer with the tape media in response to completing rotation of the guide member in the wrapping direction to enable information exchanges between the transducer and the tape media.

18. The method of claim 16 further comprising:

disengaging the transducer from the tape media prior to rotating the guide member in the unwrapping direction to eliminate friction between the transducer and the tape media during subsequent tape media movements; and engaging the transducer with the tape media after rotating the guide member in the wrapping direction to enable information exchanges between the transducer and the tape media.

19. The method of claim 11 wherein the tape guide surface has a recession, and the step of stopping rotation of the guide member includes stopping rotation of the guide member when the recession is aligned with the transducer.

20. The method of claim 11 wherein the step of stopping rotation of the guide member includes stopping rotation of the guide member when the guide member reaches a predetermined alignment angle, and the step of rotating the first wheel includes rotating the first reel while the guide member remains stationary at the alignment angle.

21. The method of claim 11 wherein the tape guide surface defines a circular, longitudinal path for the tape media.

22. The method of claim 11 wherein the tape guide surface defines, at least partially, an elliptical, longitudinal path for the tape media.

23. The method of claim 11 wherein the guide member has a pair of flanges provided on opposite sides of the tape guide surface to provide transverse guidance of the tape media.

24. A method of unspooling a tape media from a first reel, wherein the tape media spooled on the first reel is configured to have data written thereon or read therefrom by a transducer, the tape media extends between the first reel and a second reel spaced away from the first reel, and the tape media is wrapped onto a tape guide surface provided on a guide member that is rotatably disposed about the first reel and not the second reel, the method comprising:

rotating the guide member in an unwrapping direction to unwrap the tape media from the tape guide surface; and rotating the second reel to pull the tape media from the first reel and onto the second reel.

25. The method of claim 24 further comprising rotating the first reel while rotating the guide member to maintain spooling of the tape media on the first reel while the guide member is rotating.

26. The method of claim 24 wherein a transducer is engaged with the tape media, the method further comprising disengaging the transducer from the tape media in response to rotating the guide member to unwrap the tape media from the tape guide surface.

27. The method of claim 24 method further comprising routing the tape media through a second predetermined location proximate the second reel to guide the tape media to and from the second reel.

28. The method of claim 24 wherein the guide member has a pair of flanges provided on opposite sides of the tape guide surface to provide transverse guidance of the tape media.

29. A method of positioning a tape media adjacent to a transducer, the method comprising:

providing a first reel adapted to receive the tape media;

providing a guide member having a tape guide surface with a recession, the guide member being rotatably disposed about the first reel and positionable adjacent to the transducer;

rotating the guide member in a wrapping direction to wrap the tape media onto the tape guide surface and to guide the tape media adjacent to the transducer;

measuring an angular position of the guide member with respect to the transducer; and stopping rotation of the guide member when the guide member is at an alignment angle where the recession is aligned with the transducer.

30. A method of positioning a tape media adjacent to a transducer, the method comprising:

providing a first reel adapted to receive the tape media;

providing a guide member having a tape guide surface, the guide member being rotatably disposed about the first reel and positioned adjacent to the transducer;

rotating the guide member in a wrapping direction to wrap the tape media onto the tape guide surface and to guide the tape media adjacent to the transducer;

rotating the guide member in an unwrapping direction, opposite the wrapping direction, after completing rotation of the guide member in the wrapping direction to unwrap the tape media from the tape guide surface;

rotating one of the first reel and a second reel to move a predetermined location on the tape media proximate the first reel;

rotating the guide member in the wrapping direction to wrap the tape media onto the tape guide surface of the guide member; and rotating one of the first reel and the second reel to move the tape media along the tape guide surface to align the predetermined location on the tape media with the transducer.

* * * * *